Dec. 18, 1956 S. LARACH 2,774,682
METHOD OF FORMING A PHOSPHOR SCREEN
Filed Oct. 15, 1952
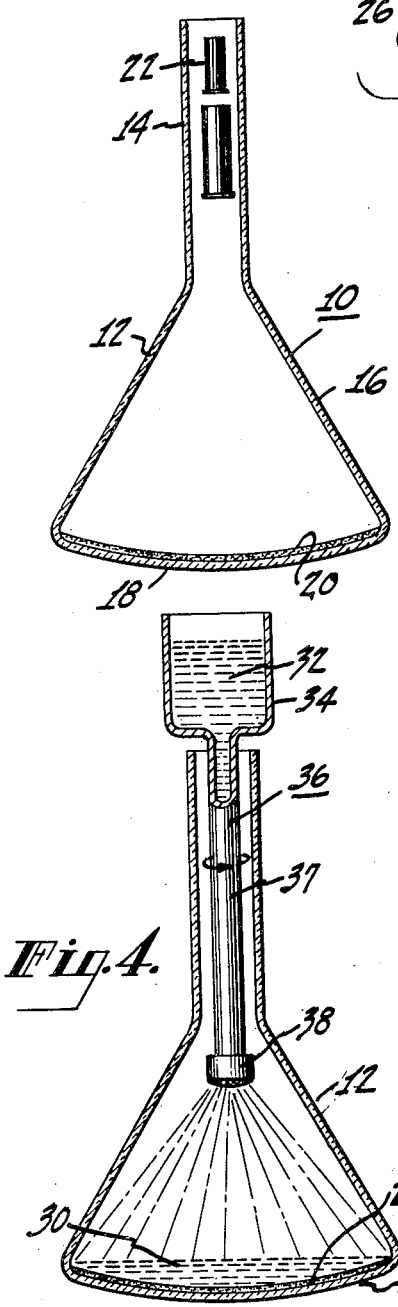
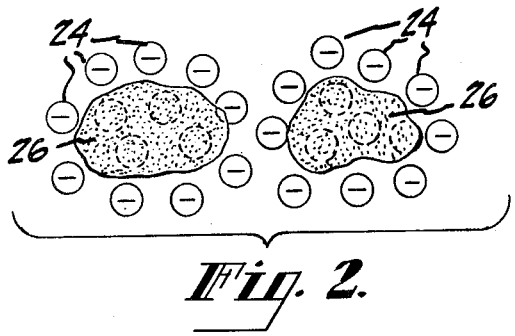
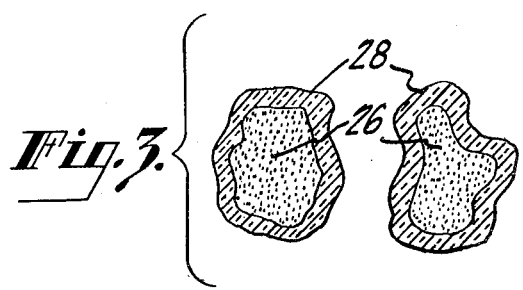
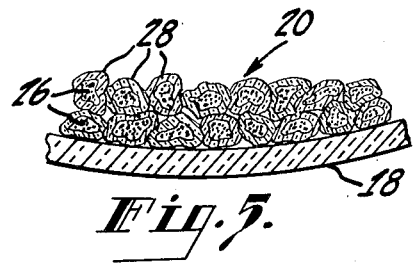
INVENTOR.
SIMON LARACH
BY William A. Zaluck
ATTORNEY

United States Patent Office 2,774,682
Patented Dec. 18, 1956

2,774,682

METHOD OF FORMING A PHOSPHOR SCREEN

Simon Larach, New Brunswick, N. J., assignor to Radio Corporation of America, a corporation of Delaware Application October 15, 1952, Serial No. 314,925

3 Claims. (Cl. 117—33.5)

This invention relates to phosphor screens and to improvements in such screens and in the method of making such screens.

When making phosphor screens, it is customary to provide a binder for the individual phosphor particles. The provision of a binder improves the cohesion of the individual particles to each other and improves their adhesion to a substrate or base plate. By this means "slippage" and "snowballing" of the screen are reduced. Slippage is movement of the screen material along the substrate. Snowballing results when a particle of phosphor material slips along the substrate and carries other particles with it much in the manner that a rolling snowball builds up from the agglomeration of individual snowflakes.

According to one conventional method of preparing a phosphor screen, the binder material is included in the settling medium through which the phosphor particles settle onto a substrate, e. g. the face plate of a cathode ray bulb. By this arrangement, the formation of a binder sheath for each phosphor particle and the settling of the particles to form the screen take place at the same time.

However, phosphor screens formed in this manner, though improved over binder-less screens, are still subject to a certain amount of slippage and snowballing. It is believed that these defects remain because the formation of the binder sheath around each phosphor particle is incomplete. The persistence of these defects may be explained by the fact that the formation of the binder sheath is often incomplete due to the fact that binder formation and particle settling occur at the same time.

The quality and completeness of the binder sheath depends on the local concentration of the binder-forming material; the higher the concentration, the better the binder sheath. However, in present day large size cathode ray tubes, the settling medium has a considerable volume and it is not economically feasible to provide such a high concentration of binder material in the settling medium as to virtually assure perfect binder formation since the settling layer and included binder materials are thrown away after the screen is formed. Thus, another disadvantage is the economic loss resulting from the discarding of a large quantity of binder material.

A further disadvantage of settling phosphor particles by the aforementioned method is that the presence of the binder materials in the settling layer increases the viscosity of that layer. Thus the settling time of the phosphor particles is increased.

Accordingly an important object of this invention is to provide an improved phosphor screen characterized by a high degree of adherence of the phosphor particles to each other and to the substrate or base plate.

Another object of the invention is to provide a method of forming such an improved phosphor screen.

Another object is to provide an improved method of forming a phosphor screen in which there is comparatively rapid settling and reduced possibility of slippage and snowballing of the screen during manufacture.

A further object is to provide an economical method of forming an improved phosphor screen.

Another object is to provide an improved phosphor screen material for fluorescent screens.

These and other objects are accomplished, according to the principles of the invention, by forming a substantially complete binder sheath around each phosphor particle by first adsorbing the negative ions of an electrolyte on the surfaces of the phosphor particles. Then the ion-bearing phosphor particles are mixed with a solution of an alkali silicate. This treatment results in the formation around each phosphor particle of a binder sheath composed of a complex substance which results from the reaction of the electrolyte ions with the alkali silicate. Finally the sheathed phosphor particles are settled through a nonreactive medium, for example water, onto a substrate or base plate which may be the glass face plate of a cathode ray tube.

The invention is described with reference to the single sheet of drawings wherein:

Fig. 1 is a longitudinal sectional view of one type of electron tube to which the principles of the invention apply;

Fig. 2 shows the individual phosphor particles as they appear at one time during the process of the invention;

Fig. 3 shows the individual phosphor particles as they appear at another time during the process;

Fig. 4 is a sectional view of a cathode ray tube envelope in the process of having a phosphor screen settled therein according to this invention; and, Fig. 5 is an enlarged sectional view of a portion of a phosphor screen prepared according to the invention.

Referring to Fig. 1, I have shown one type of tube to which the principles of my invention are applicable. The tube shown is a cathode ray tube 10 which comprises an envelope or bulb 12 having a neck portion 14 and an expanded bulb portion 16. The bulb 12 has an end wall or face plate 18 on which a phosphor screen 20 is deposited according to the principles of this invention. An electron gun 22 mounted in the neck 14 of the envelope is adapted to direct a beam of electrons toward the phosphor screen 20 over which the beam is scanned by the usual magnetic or electrostatic means.

According to the invention, and referring to Figs. 2 and 3 the first step of the method comprises adsorbing electrolyte anions 24 on the surfaces of individual phosphor particles 26 which are to be deposited as a phosphor screen on a face plate of a cathode ray tube. One suitable phosphor material which may be treated according to the principles of the invention is silver activated zinc sulfide. However, other phosphors may be similarly processed. For providing the electrolyte ions halides, sulfates or other suitable salts such as alkali and alkaline earth chlorides and sulfates may be used. In this process, the cation is relatively unimportant.

One specific procedure devised for settling a phosphor screen on a cathode ray tube having a face plate diameter of approximately two inches includes the following steps: First, a suspension A consisting of approximately two grams of phosphor material and approximately 20 milliliters of water is prepared. A second suspension B is prepared by mixing one milliliter of suspension A with approximately four milliliters of water and approximately one milliliter of one molar sodium chloride solution. The sodium chloride solution provides the electrolyte anions and the concentration of the solution is not critical. The constituents of suspension B are mixed thoroughly in any suitable vessel and by any suitable means. By this procedure the electrolyte chloride ions 24 are adsorbed on the surfaces of the individual phosphor particles 26.

The formation of the binder sheath 28 around each phosphor particle is completed by adding approximately one milliliter of 25% potassium silicate to the suspension B. Here too the percentage concentration of the silicate is not critical. This combination is also thoroughly mixed by any suitable means.

The phosphor material is now in condition for the final steps in the process of forming a phosphor screen in a cathode ray bulb. This procedure may be carried out by any suitable method. One such method is described in the Painter U. S. Patent 2,328,292. Referring to Fig. 4, according to the method described in the patent a clear cushion layer 30 of water is provided in the bulb 12 as a settling medium for the phosphor particles. For a bulb of the size under consideration approximately 15 milliliters of water are used for the settling medium. The suspension 32 of phosphor particles having binder sheaths such as shown in Fig. 3 is fed into a dispenser 36 comprising a reservoir 34 and a funnel 37 extending therefrom and terminating in a feed nozzle 38. The suspension passes from the reservoir, down the funnel and out of the feed nozzle which is disposed within the cathode ray bulb to be provided with the phosphor screen. This procedure is carried out preferably while the dispenser 36 is rotated. The phosphor suspension pours out of the nozzle 38 and spreads uniformly over the surface of the cushion layer 30. The phosphor particles are allowed to settle through the cushion layer until they come to rest on the glass face plate 18. Because of the binder sheath carried by each phosphor particle, the particles adhere readily to the face plate 18 and to each other and a uniform and compact phosphor screen 20 is formed. A portion of the screen is shown in Fig. 5.

If it is desired to form a phosphor screen in larger size bulbs than the one described above, the quantities of materials employed are scaled accordingly.

The improved screen made according to this invention was tested by a stream of water directed against the surface of the screen. In comparing screens made by other methods and similarly tested, the screen of the invention showed superior particle adherence. That is, under the same test conditions, the screen of this invention showed less tendency to lose surface phosphor particles than the other screens tested.

One advantage of the present method of preparing a phosphor screen is that the binder may be formed in a separate operation and small concentrated amounts of binder materials may be used. By thus treating the phosphor particles, the formation of a complete binder sheath around each particle is substantially assured. Thus a better screen is assured. Another advantage of the invention arises from the fact that water alone may be used as the settling medium. Since the viscosity of water is lower than the viscosity of the water and binder mixture used on other methods, the settling time for a screen prepared by this invention is reduced. In addition, an economic advantage derives from the fact that large amounts of binder materials are not used with and discarded with the settling medium.

What is claimed is:
1. The method of forming a phosphor screen on a substrate, said method comprising the steps of preparing a water suspension of finely divided phosphor particles, introducing said suspension into a solution of an alkali halide to form a second suspension, thoroughly mixing the constituents of said second suspension in order to adsorb halide ions onto the surfaces of each of said phosphor particles, treating said phosphor particles and adsorbed halide ions with an alkali silicate to form a binder sheath around said phosphor particles, forming a suspension of said sheathed phosphor particles, introducing said last mentioned suspension over said substrate, and settling said sheathed particles onto said substrate through a neutral settling medium.

2. The method of forming a phosphor screen on the inner surface of a cathode ray tube face plate, comprising the steps of preparing a water suspension of finely divided phosphor particles, thoroughly mixing said suspension with a solution of sodium chloride in order to adsorb chloride ions onto the surfaces of each of said phosphor particles, introducing a solution of potassium silicate into said suspension, and thoroughly mixing the constituents of said suspension in order to form a binder sheath around each of said phosphor particles, introducing said suspension of sheathed particles over said face plate, and settling said sheathed particles onto said face plate through a water cushion layer.

3. The method of forming a phosphor screen on a substrate comprising the steps of preparing a water suspension of finely divided phosphor particles, introducing said suspension into a solution of a material selected from the group consisting of alkali halides, alkali sulfates, alkaline earth halides, and alkaline earth sulfates to form a second suspension, thoroughly mixing the constituents of said second suspension in order to adsorb negative ions onto the surfaces of each of said phosphor particles, treating said phosphor particles and adsorbed negative ions with an alkali silicate to form a binder sheath around said phosphor particles, forming a suspension of said sheathed phosphor particles, introducing said last mentioned suspension over said substrate, and settling said sheathed particles onto said substrate through a settling medium.

References Cited in the file of this patent
UNITED STATES PATENTS

| | | |
|---|---|---|
| 2,108,683 | Leverenz | Feb. 15, 1938 |
| 2,328,292 | Painter | Aug. 31, 1943 |
| 2,451,590 | Tidik et al. | Oct. 19, 1948 |
| 2,475,330 | Levy | July 5, 1949 |
| 2,528,384 | Mitchell | Oct. 31, 1950 |
| 2,536,586 | Waye | Jan. 2, 1951 |
| 2,573,051 | Pakswer | Oct. 30, 1951 |